US011635919B1

(12) United States Patent
Pohlack et al.

(10) Patent No.: US 11,635,919 B1
(45) Date of Patent: Apr. 25, 2023

(54) SAFE SHARING OF HOT AND COLD MEMORY PAGES

(71) Applicant: Amazon Technologies, Inc., Seattle, WA (US)

(72) Inventors: Martin Pohlack, Dresden (DE); Peter Barry, Limerick (IE); Filippo Sironi, Dresden (DE)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/491,252

(22) Filed: Sep. 30, 2021

(51) Int. Cl.
*G06F 3/06* (2006.01)
*G06F 12/1045* (2016.01)
*G06F 12/0882* (2016.01)

(52) U.S. Cl.
CPC .......... *G06F 3/0659* (2013.01); *G06F 3/0604* (2013.01); *G06F 3/065* (2013.01); *G06F 3/0613* (2013.01); *G06F 3/0673* (2013.01); *G06F 12/0882* (2013.01); *G06F 12/1054* (2013.01); *G06F 12/1063* (2013.01)

(58) Field of Classification Search
None
See application file for complete search history.

(56) References Cited

U.S. PATENT DOCUMENTS

| | | | | |
|---|---|---|---|---|
| 7,774,645 B1 * | 8/2010 | Clark | ................... | G06F 11/2076 714/13 |
| 8,799,554 B1 * | 8/2014 | Vincent | ................. | G06F 9/5016 718/107 |
| 10,528,736 B1 * | 1/2020 | Sobel | ................... | G06F 12/1433 |
| 2003/0163543 A1 * | 8/2003 | Deneroff | ............ | G06F 12/0813 709/214 |
| 2012/0137303 A1 * | 5/2012 | Okada | ................... | G06F 3/0641 718/104 |
| 2015/0082001 A1 * | 3/2015 | Duncan | ............... | G06F 12/1009 711/206 |

(Continued)

OTHER PUBLICATIONS

Juerg Haefliger et al, "Add support for exclusive Page Frame Ownership (XPFO)", dated Jun. 30, 2021, (Https://lwn.net/Article/699116), pp. 1-2.

(Continued)

*Primary Examiner* — Yaima Rigol
(74) *Attorney, Agent, or Firm* — S. Scott Foster; Kowert, Hood, Munyon, Rankin & Goetzel, P.C.

(57) ABSTRACT

A computing device including executable processes may determine that a future likelihood of access for virtual memory pages of an executable process are below a threshold likelihood of access based on an execution status of the executable process or a tracking of memory accesses to the virtual memory pages of the executable process. Responsive to this determination, memory pages found to store contents matching that of memory pages mapped to other processes may be unmapped from the process and released for reuse by the computing device. The virtual memory pages may then be marked as being shared with the similar memory pages mapped to the other processes. At a later time, the memory pages of the process may be configured to be non-shared, the configuring including either copying respective shared pages to non-shared pages or enabling a processor exception on access to the memory pages.

20 Claims, 9 Drawing Sheets

(56) References Cited

U.S. PATENT DOCUMENTS

| | | | | |
|---|---|---|---|---|
| 2015/0269111 A1* | 9/2015 | Bak | ................ | G06F 13/1663 |
| | | | | 711/147 |
| 2015/0293720 A1* | 10/2015 | Lam | ................ | G06F 9/5016 |
| | | | | 711/147 |
| 2016/0098302 A1* | 4/2016 | Ben-Yehuda | ......... | G06F 9/4856 |
| | | | | 718/1 |
| 2016/0350244 A1* | 12/2016 | Tsirkin | ................ | G06F 3/0664 |
| 2016/0378530 A1* | 12/2016 | Ramasubramanian | ................ | |
| | | | | G06F 9/45558 |
| | | | | 718/1 |
| 2021/0216232 A1* | 7/2021 | Xie | ................ | G06F 15/167 |
| 2022/0214901 A1* | 7/2022 | Tsirkin | ................ | G06F 9/5088 |

OTHER PUBLICATIONS

"OpenSSL Privilege Separation Analysis", dated Jun. 30, 2021, (https://access.redhat.com/blogs/766093/posts/1976283), pp. 1-4.

* cited by examiner

Determine that virtual memory pages of a virtual memory space of an executable process will not be accessed due to an expectation that the process will not be scheduled for execution for an amount of time exceeding a threshold amount of time. 500

Remap at least a portion of the virtual memory pages of the process from respective nonshared physical memory pages to respective shared physical memory pages, the shared physical memory pages also mapped to at least one other virtual address space. 510

Set the executable process to a parked state. 520

Determine that the executable process is to be scheduled for execution, and responsive to the determination remap the at least a portion of the virtual memory pages of the virtual memory space of the process from respective shared physical memory pages to respective nonshared physical memory pages and copy the contents of the respective shared physical memory pages to the respective nonshared physical memory pages. 530

Set the executable process to an active state and schedule the process for execution. 540

SAFE SHARING OF HOT AND COLD MEMORY PAGES

BACKGROUND

A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. Multitenancy refers to the ability of multiple virtualized resources (perhaps belonging to different accounts or customers) to simultaneously make use of the same hardware computing resources. Despite the fact that they share resources, the virtual resources in different accounts (or belonging to different virtual networks) are not aware the others that are using the same hardware, and their data is kept totally separate. Multitenancy is an important component of cloud computing.

BRIEF DESCRIPTION OF THE DRAWINGS

FIG. 5 is a flow diagram illustrating safe sharing of memory pages including copying of shared pages prior to process execution, according to some embodiments.

Figure 1:
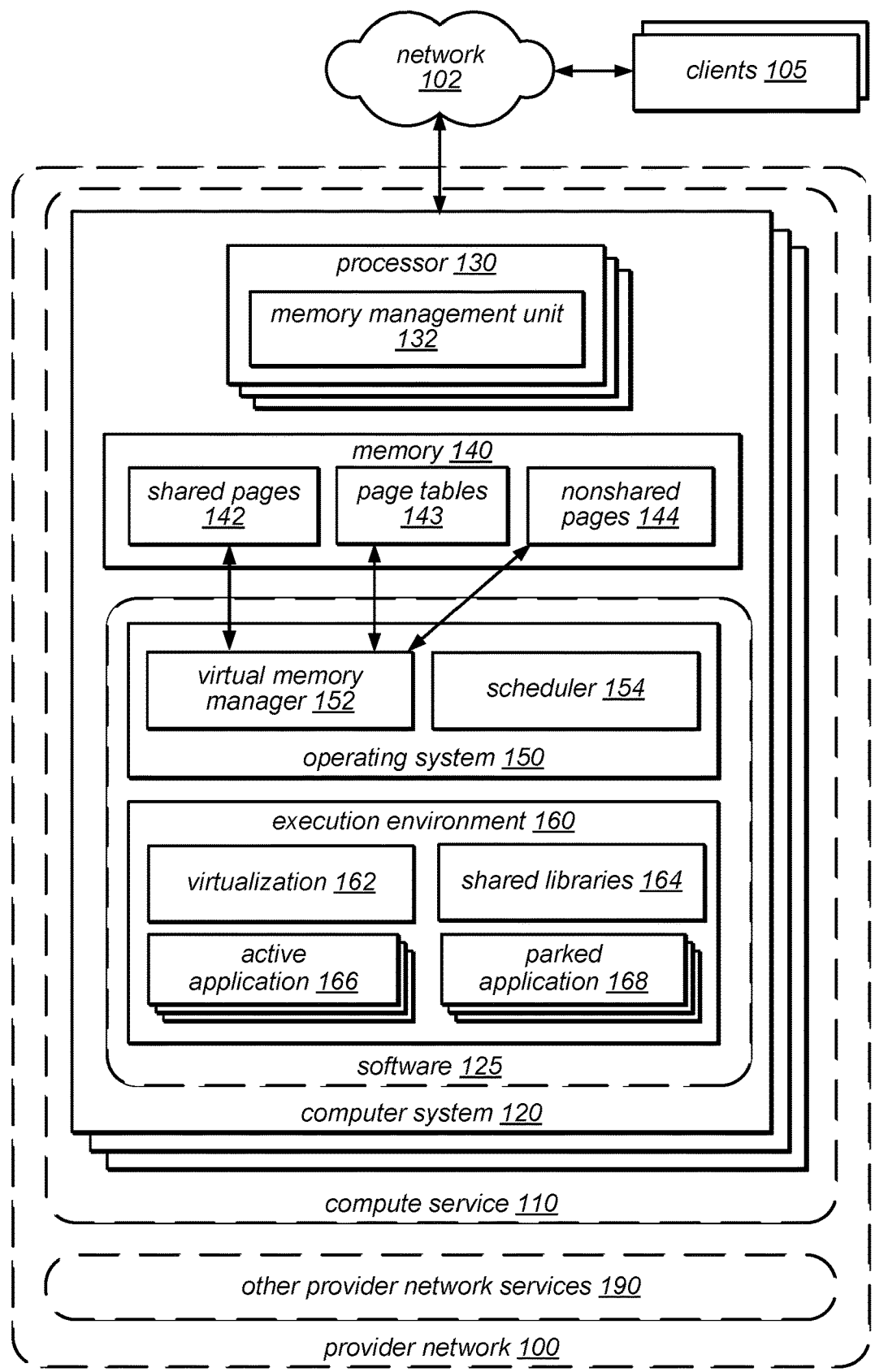
FIG. 1 is a block diagram of a system that implements safe sharing of memory pages, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

In various computing applications, opportunities may exist where significant memory sharing between applications may be implemented. An example of such a computing application is in virtual computing, where computer virtualization may result in situations where many virtual machines (VMs, guests or compute instances) are similar to some extent. These virtual machines may run common code, use the same underlying disk image and so on. Thus, there may exist significant potential for sharing of physical memory to more efficiently utilize the shared hardware resources and to potentially increase VM density, particularly in systems such as network-based virtualization services, resulting in lower memory requirements in those computer systems.

Operating systems may support this sharing via shared libraries, buffer caches, and kernel-same-page merging. At the same time, however, there exist well-known security issues with sharing memory in multitenant systems, making memory sharing between isolation boundaries (e.g., accounts, network segments, virtual private clouds/networks) problematic. To address these security issues, various embodiments of a system that implements safe sharing of memory pages are disclosed.

These various embodiments may reduce the memory footprint of virtual machine processes by deduplicating, and marking as shared, virtual memory pages that are allocated but not actively accessed. In some embodiment, the transitioning of processes, such as VM processes, into and out of standby, or parked, states may allow for the sharing of virtual memory pages while not actively accessed. In other embodiments, continuous monitoring of memory access frequencies enables dynamic transitions of individual pages from shared to non-shared states. Simultaneous access to shared pages may be prevented to ensure that virtual memory used by different tenants in a multitenant environment are properly isolated, thus providing for safe sharing of memory pages. By reducing memory resources of standby virtual machines, overall memory consumption, a common limiting factor, of the hosting servers can be reduced.

A computer system including executable processes may determine that a process may not be scheduled for execution for an amount of time exceeding a threshold. Responsive to this determination, the process may be placed in a parked state by deduplicating memory pages mapped to the process. Memory pages found to store contents matching that of memory pages mapped to other parked processes may be unmapped from the process and released for reuse by the computing device. To maintain the executable process in the parked state, deduplicated memory pages are marked as being shared with similar memory pages mapped to the other parked process. Prior to a transition from the parked state to an active state, shared memory pages of the process may be configured to be non-shared, the configuring including either copying respective shared pages to non-shared pages or enabling a processor exception on access to the shared pages.

FIG. 1 is a block diagram of a system that implements safe sharing of memory pages, according to some embodiments. A computer system 120, such as the computer system 2000 shown in further detail in FIG. 9 below, may implement safe sharing of memory pages, in some embodiments. This computer system may be a standalone computer system in some embodiments or may be one of a number of computer systems as part of a compute service 110 of a provider network 100 that provides a variety of network services including other network services 190, in other embodiments. In some embodiments, the computer system, as part of a compute service 110, may provide services to various clients 105 connected over a network 102. For example, compute service 110 may provide various computing resources, such as compute instances discussed below, or may provide "serverless" computing resources, such as event-driven computing resources that execute various tasks or operations responsive to requests or other events without provisioning or managing servers, creating scaling logic, or managing runtimes.

Provider network 100 may can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the provider network 100 via a publicly accessible network (e.g., the Internet, a cellular communication network). Regions are connected to a global network which includes private networking infrastructure (e.g., fiber connections controlled by the cloud provider) connecting each region to at least one other region. The provider network 100 may deliver content from points of presence outside of, but networked with, these regions by way of edge locations and regional edge cache servers. An edge location can be an extension of the cloud provider network outside of the traditional region/AZ context. For example an edge location can be a data center positioned to provide capacity to a set of customers within a certain latency requirement, a set of servers provided to a customer's premises, or a set of servers provided within (or forming part of) a cellular communications network, each of which can be controlled at least in part by the control plane of a nearby AZ or region. This compartmentalization and geographic distribution of computing hardware enables the provider network 100 to provide low-latency resource access to customers on a global scale with a high degree of fault tolerance and stability.

The traffic and operations of the cloud provider network may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the cloud provider network (e.g., compute instances, containers, block storage volumes, databases, file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

In some embodiments, provider network 100 may include the hardware (e.g., modems, routers, switches, load balancers, proxy servers, etc.) and software (e.g., protocol stacks, accounting software, firewall/security software, etc.) necessary to establish a networking links between different components of provider network 100, such as virtualization hosts, control plane components as well as external networks, such as network 102 (e.g., the Internet). In some embodiments, provider network 100 may employ an Internet Protocol (IP) tunneling technology to provide an overlay network via which encapsulated packets may be passed through the internal network using tunnels. The IP tunneling technology may provide a mapping and encapsulating system for creating an overlay network and may provide a separate namespace for the overlay layer and the internal network layer. Packets in the overlay layer may be checked against a mapping directory to determine what their tunnel target should be. The IP tunneling technology provides a virtual network topology; the interfaces that are presented to clients 105 may be attached to the overlay network so that when a client 105 provides an IP address that they want to send packets to, the IP address is run in virtual space by communicating with a mapping service that knows where the IP overlay addresses are.

The computer system 120 may include one or more processors 130, with each processor including a memory management unit 132 to support virtual memory services of software 125 including an operating system 150, in some embodiments. To provide these virtual memory services, the operating system 150 may include a virtual memory manager 152 which interacts with physical pages of a memory 140, the physical pages including shared pages 142 and nonshared pages 144, in some embodiments. Also included in the memory 140 are page tables 143 to support the virtual memory services.

The computer system 120 may include software 125 including an operating system 150 to provide an execution environment 160 for respective processes of applications, in various embodiments. Included in the software 125 may be a virtual memory manager 152 to provide virtual memory services for the execution environment 160. The virtual memory manager 152 may then interact with physical pages of a memory 140 and the page tables 143 to support these virtual memory services, in some embodiments.

The execution environment 160 may include various elements that enable sharing of memory pages, such as virtualization software 162 and shared libraries 164. Other examples of elements that enable sharing of memory pages may be imagined and these examples shown in FIG. 1 are not intended to be limiting.

In some embodiments, virtualization software 162 may enable the creation of multiple virtual machines (VMs, guests or compute instances) which are similar to a great extent. These virtual machines may run common code, for example, and use similar or identical underlying disk images. Other similarities may exist and these examples are not intended to be limiting.

In some embodiments, these VMs may implement a virtual computing service, such as the compute service 110, that provides compute instances that are ready to execute tasks or applications for clients 105. In various embodiments, compute instance(s) may be implemented with a specified computational capacity (which may be specified by indicating the type and number of CPUs, the main memory size, and so on) and a specified software stack (e.g., a particular version of an operating system, which may in turn run on top of a hypervisor).

In some embodiments, compute instances may correspond to one of several instance families. An instance family may be characterized by its hardware type, computational resources (e.g., number, type, and configuration of central processing units [CPUs] or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics (such as being a "burstable" instance type that has a baseline performance guarantee and the ability to periodically burst above that baseline, or a non-burstable or dedicated instance type that is allotted and guaranteed a fixed quantity of resources). Each instance family can have a specific ratio of processing, local storage, memory, and networking resources, and different instance families may have differing types of these resources as well. Multiple sizes of these resource configurations can be available within a given instance family, referred to as "instance types." Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification.

Compute instances may operate or implement a variety of different frameworks, such as application server instances, general purpose or special-purpose operating systems, platforms that support various interpreted or compiled programming languages such as Ruby, Perl, Python, C, C++ and the like, or high-performance computing platforms) suitable for performing client applications, without, for example, requiring the client to access an instance. Applications (or other software operated/implemented by a virtual compute instance and may be specified by client(s), such as custom and/or off-the-shelf software.

In some embodiments, compute instances may have different types or configurations based on expected uptime ratios. The uptime ratio of a particular compute instance may be defined as the ratio of the amount of time the instance is activated, to the total amount of time for which the instance is reserved. Uptime ratios may also be referred to as utilizations in some implementations. If a client expects to use a compute instance for a relatively small fraction of the time for which the instance is reserved (e.g., 30%-35% of a year-long reservation), the client may decide to reserve the instance as a Low Uptime Ratio instance, and pay a discounted hourly usage fee in accordance with the associated pricing policy. If the client expects to have a steady-state workload that requires a compute instance to be up most of the time, the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances, with a corresponding pricing policy, may be supported in some embodiments as well, where the upfront costs and the per-hour costs fall between the corresponding High Uptime Ratio and Low Uptime Ratio costs.

Compute instance configurations may also include virtual compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, such as a particular number of virtual CPU cores, memory, cache, storage, as well as any other performance characteristic. Configurations of compute instances may also include their location, in a particular data center, availability zone, geographic, location, etc. . . . and (in the case of reserved compute instances) reservation term length.

VMs implemented by virtualization software 162 may be configured similarly and have a significant virtual memory footprint that is duplicated across the VMs, and as at least some these VMs are kept in a ready-to-execute state, while not actively execution applications on behalf of clients, there may exist significant potential for sharing of physical memory pages among the VMs to increase VM density for the system.

The collective applications of the execution environment 160 may include active applications 166 and parked applications 168. The active applications 166 may currently be scheduled for execution by the scheduler 154 while the parked applications 168 may not be scheduled for execution by the scheduler 154 but remain in a ready-to-execute state.

Active applications 166 may include virtual memory pages (not shown) that may be provided access to nonshared pages 144 by the virtual memory manager 152, in some embodiments. Parked applications 168 may include virtual memory pages (not shown) that may be provided access to shared pages 144, instead of or in addition to, access to nonshared pages 144 by the virtual memory manager 152, in some embodiments.

Applications may transition from a parked state to an active state, these transitions coordinated between the scheduler 143 and virtual memory manager 152, which may be collectively referred to a memory manager, in some embodiments. When transitioning between an active state and a parked state, the memory manager may transition all or a portion of virtual memory pages of an application from nonshared memory pages 144 to shared memory pages 142, in some embodiments. Likewise, when transitioning between a parked state and an active state, the memory manager may transition virtual memory pages of an application from shared memory pages 142 to nonshared memory pages 144, as discussed below in FIGS. 4-8, in some embodiments.

Figure 2:
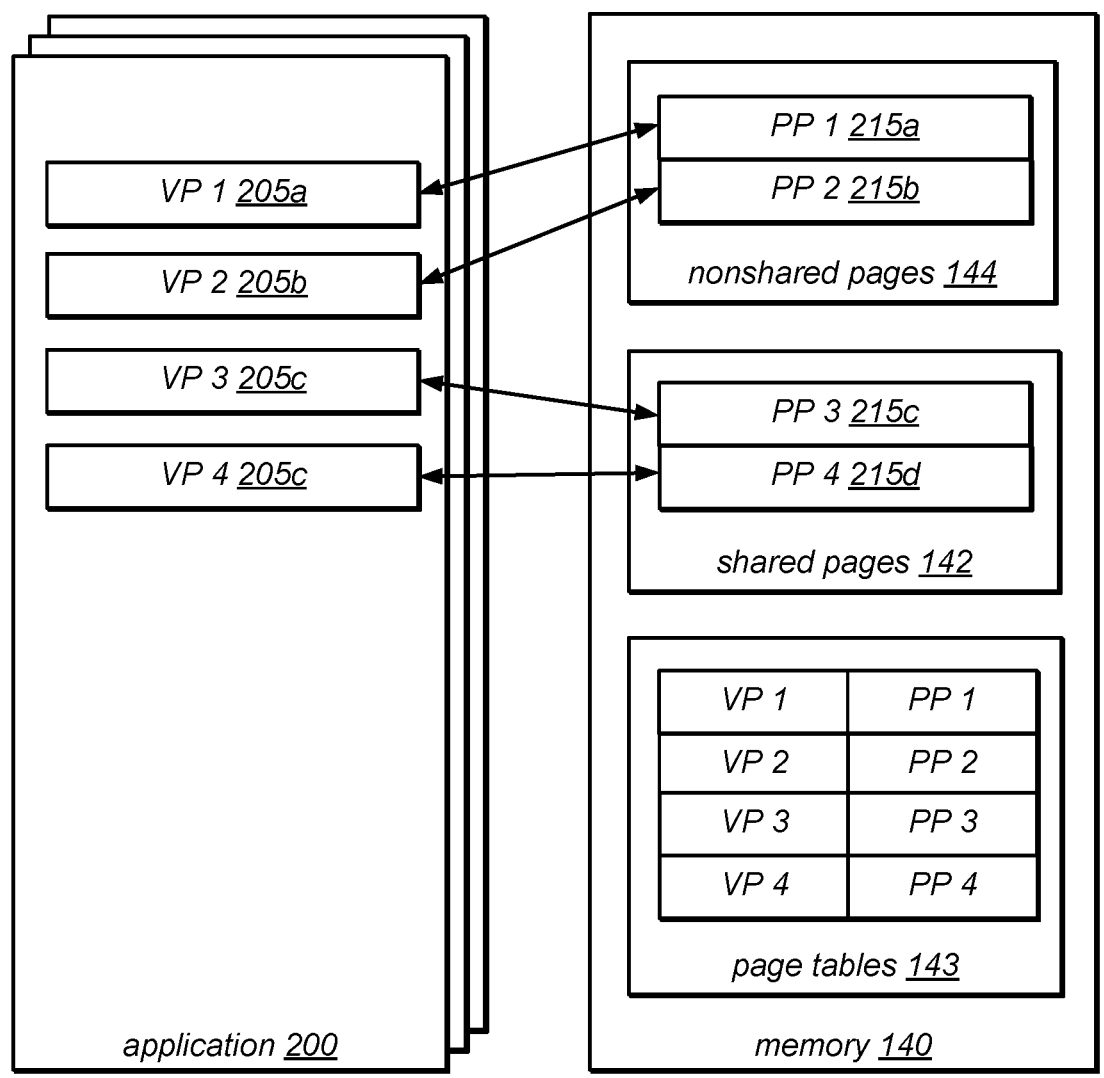
FIG. 2 is a block diagram illustrating portions of a virtual memory system safe sharing of memory pages, according to some embodiments.

FIG. 2 is a block diagram illustrating portions of a virtual memory system providing sharing of memory pages in the computer system 120 of FIG. 1, according to some embodiments. Virtual memory pages 205 of a virtual memory address space of application(s) 200, such as the active applications 166 and parked applications 168 of FIG. 1, may map to various physical memory pages 215 of the memory 140.

Different applications 200 may have different virtual address spaces in the computer system 120, however at least a portion of the virtual memory pages of these virtual address spaces may map to shared physical memory pages.

In some embodiments, virtual memory pages may map entirely to either shared pages 142 or nonshared pages 144 while in other embodiments, individual virtual memory pages of a given application may map to a shared memory page such as 215c and 215d, while other virtual memory pages of the given application may map to a nonshared memory page such as 215a and 215b. Arrows shown in FIG. 2 illustrate current mappings between various virtual memory pages and physical memory pages of memory 140.

At least a portion of virtual memory pages of an application may transition between mappings to nonshared memory pages 144 and shared memory pages 142 during transitions between an active state of the application and a parked state of the application, as discussed above in FIG. 1 and as discussed further below in FIGS. 4-8, in some embodiments.

Figure 3:
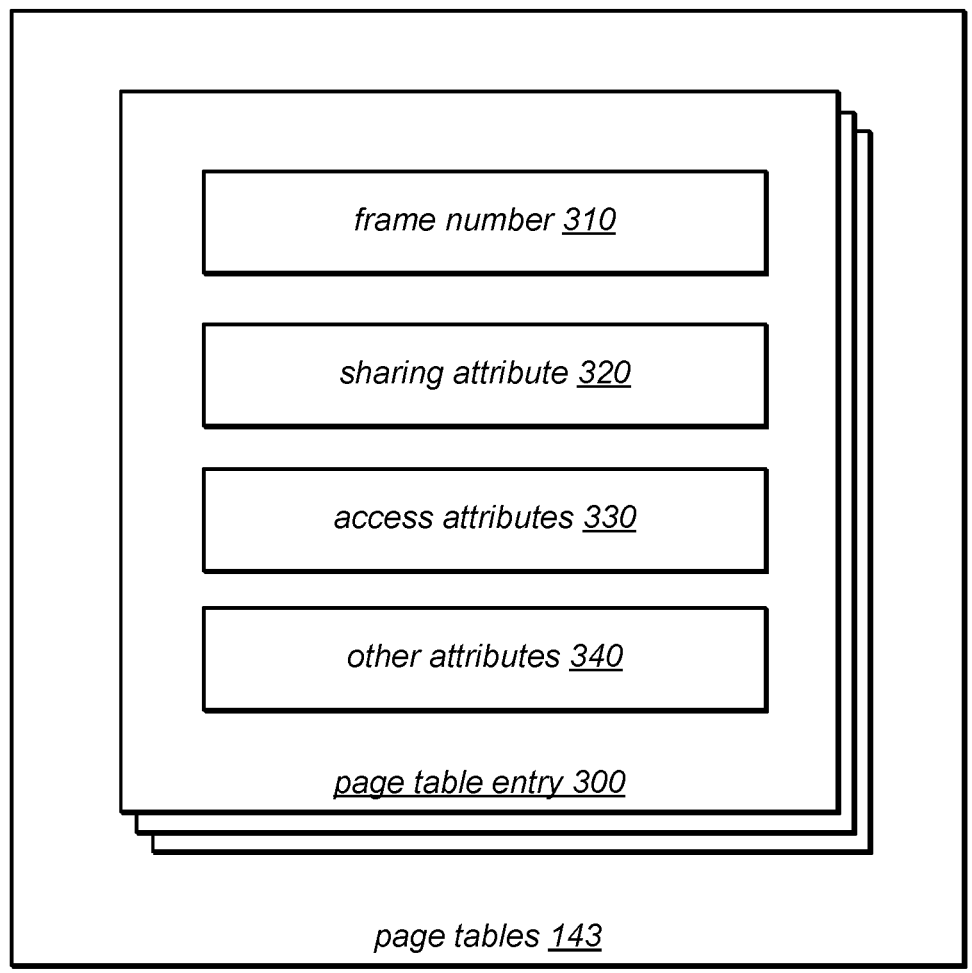
FIG. 3 is a block diagram illustrating portions of a page tables supporting sharing of memory pages, according to some embodiments.

The memory 140 may further include pages tables 143 that define the mappings between the various virtual memory pages and physical memory pages, and discussed further in FIG. 3.

FIG. 3 is a block diagram illustrating portions of a page tables supporting sharing of memory pages, according to some embodiments. Page tables 143 may include multiple page table entries 300 which may define mappings of various virtual memory pages to physical memory pages, such as the virtual memory pages 205 and physical memory pages 215 as shown in FIG. 2, in some embodiments. Individual ones of the page table entries 300 may include a frame number 310 for identifying the particular physical memory page associated with the respective page table entry 300 and may include a number of attributes for the page table entry including a sharing attribute 320, access attributes 330 and other attributes 340, in some embodiments. Examples of the other attributes 340 may be a presence attribute, one or more memory protection attributes, caching attributes, and so forth. These example attributes are not intended to be limiting and any number of other attributes may be envisioned.

A memory manager implementing sharing of memory pages may store an indication of shared page status in the sharing attribute 320 and may further indicate a nonshared page status using a different stored value in the sharing attribute 320, in some embodiments. In addition, the memory manager may control access to shared memory pages and nonshared memory pages using various access attributes 330. Using combinations of the sharing 320 and access 330 attributes, the memory manager may implement safe sharing of memory pages as discussed in further detail in FIGS. 4-8 below.

Figure 4:
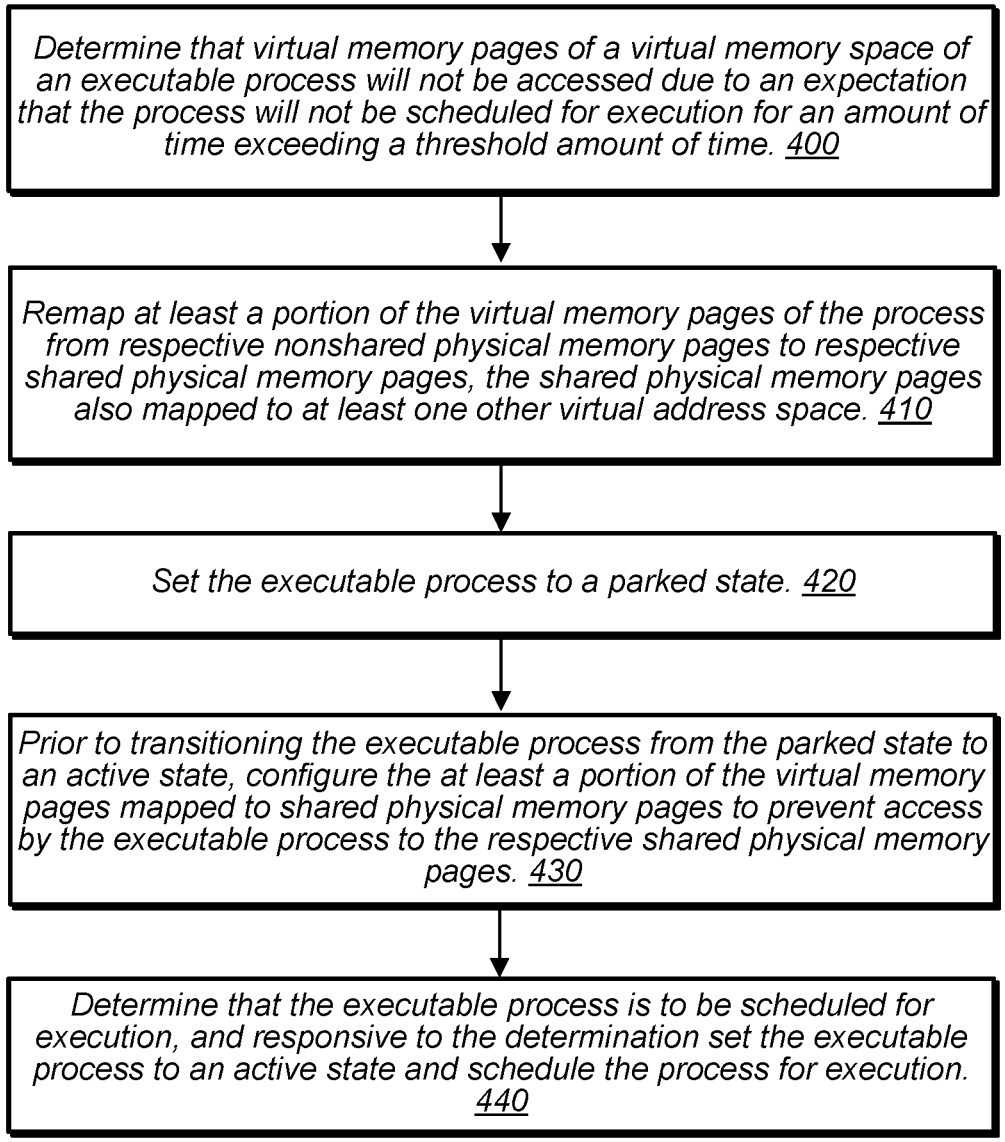
FIG. 4 is a flow diagram illustrating safe sharing of memory pages, according to some embodiments.

FIG. 4 is a flow diagram illustrating safe sharing of memory pages, according to some embodiments. The method begins at step 400 where it may be determined, by a shared memory manager such as the virtual memory manager 152 or scheduler 154 as shown in FIG. 1, that virtual memory pages of a virtual memory space of an executable process, such as the active application 166 as shown in FIG. 1, will not be accessed due to an expectation that the process will not be scheduled for execution for an amount of time exceeding a threshold amount of time, in some embodiments. The threshold amount of time may be, in various embodiments, selected in a number of ways. For example, in one embodiment it may set to a constant value greater than zero while in other embodiments it could be determined, for example, by a total number of processes, total amount of allocated or total memory, total number of active or parked processes, and so on. Other means of determining a threshold amount of time may be imagined and the examples are not intended to be limiting. In some embodiments.

In addition, in some embodiments the determination to set the process to a parked state may be responsive to determining that a utilization of pages of physical memory exceeds a threshold memory utilization, in addition to or instead of the expectation that the process will not be scheduled for execution for an amount of time. In these embodiments, the utilization of pages of physical memory and the threshold memory utilization may be expressed as a percentage of total physical memory.

Responsive to the determining, the method may proceed to step 410 where the memory manager may remap at least a portion of the virtual memory pages, such as virtual memory pages 205 as shown in FIG. 2, of the virtual memory space of the process from respective nonshared physical memory pages, such as the physical memory pages 215a and 215b of nonshared pages 144 as shown in FIG. 2, to respective shared physical memory pages, such as the physical memory pages 215c and 215d of shared pages 142 as shown in FIG. 2, in some embodiments. These shared physical memory pages may also be mapped to at least one other virtual address space of another process, in some embodiments. The memory manager may then set the executable process to a parked state, as shown in 420, in some embodiments.

As shown in 430, the memory manager may then configure the remapped virtual memory pages, prior to transitioning the executable process from the parked state to an active state, to prevent access by the executable process to the respective shared physical memory pages, in some embodiments. This configuring may be perform prior to, subsequent to or at the same time as setting the process to a parked state, as shown in 420, in various embodiments. This configuring, however, may occur prior transitioning the executable process from the parked state to an active state.

The memory manager may then determine that the executable process is to be scheduled for execution, and responsive to the determination set the executable process to an active state and schedule the process for execution, as shown in 440, in some embodiments.

FIG. 5 is a flow diagram illustrating safe sharing of memory pages including copying of shared pages prior to process execution, according to some embodiments. The method begins at step 500 where it may be determined, by a shared memory manager such as the virtual memory manager 152 or scheduler 154 as shown in FIG. 1, that virtual memory pages of a virtual memory space of an executable process, such as the active application 166 as shown in FIG. 1, will not be accessed due to an expectation that the process will not be scheduled for execution for an amount of time exceeding a threshold amount of time, in some embodiments. The threshold amount of time may be, in various embodiments, selected in a number of ways. For example, in one embodiment it may set to a constant value greater than zero while in other embodiments it could be determined, for example, by a total number of processes, total amount of allocated or total memory, total number of active or parked processes, and so on. Other means of determining a threshold amount of time may be imagined and the examples are not intended to be limiting. In some embodiments.

In addition, in some embodiments the determination to set the process to a parked state may be responsive to determining that a utilization of pages of physical memory exceeds a threshold memory utilization, in addition to or instead of the expectation that the process will not be scheduled for execution for an amount of time. In these embodiments, the utilization of pages of physical memory and the threshold memory utilization may be expressed as a percentage of total physical memory.

Responsive to determining to set a process to a parked state, the method may proceed to step 510 where the memory manager may remap at least a portion of the virtual memory pages, such as virtual memory pages 205 as shown in FIG. 2, of the virtual memory space of the process from respective nonshared physical memory pages, such as the physical memory pages 215*a* and 215*b* of nonshared pages 144 as shown in FIG. 2, to respective shared physical memory pages, such as the physical memory pages 215*c* and 215*d* of shared pages 142 as shown in FIG. 2, in some embodiments. These shared physical memory pages may also be mapped to at least one other virtual address space of another process, in some embodiments. The memory manager may then set the executable process to a parked state, as shown in 520, in some embodiments.

As shown in 530, the memory manager may then determine that the executable process is to be scheduled for execution, and responsive to the determination remap the at least a portion of the virtual memory pages of the virtual memory space of the process from respective shared physical memory pages to respective nonshared physical memory pages and copy the contents of the respective shared physical memory pages to the respective nonshared physical memory pages, in some embodiments.

The memory manager may then set the executable process to an active state and schedule the process for execution, as shown in 540, in some embodiments.

Figure 6:
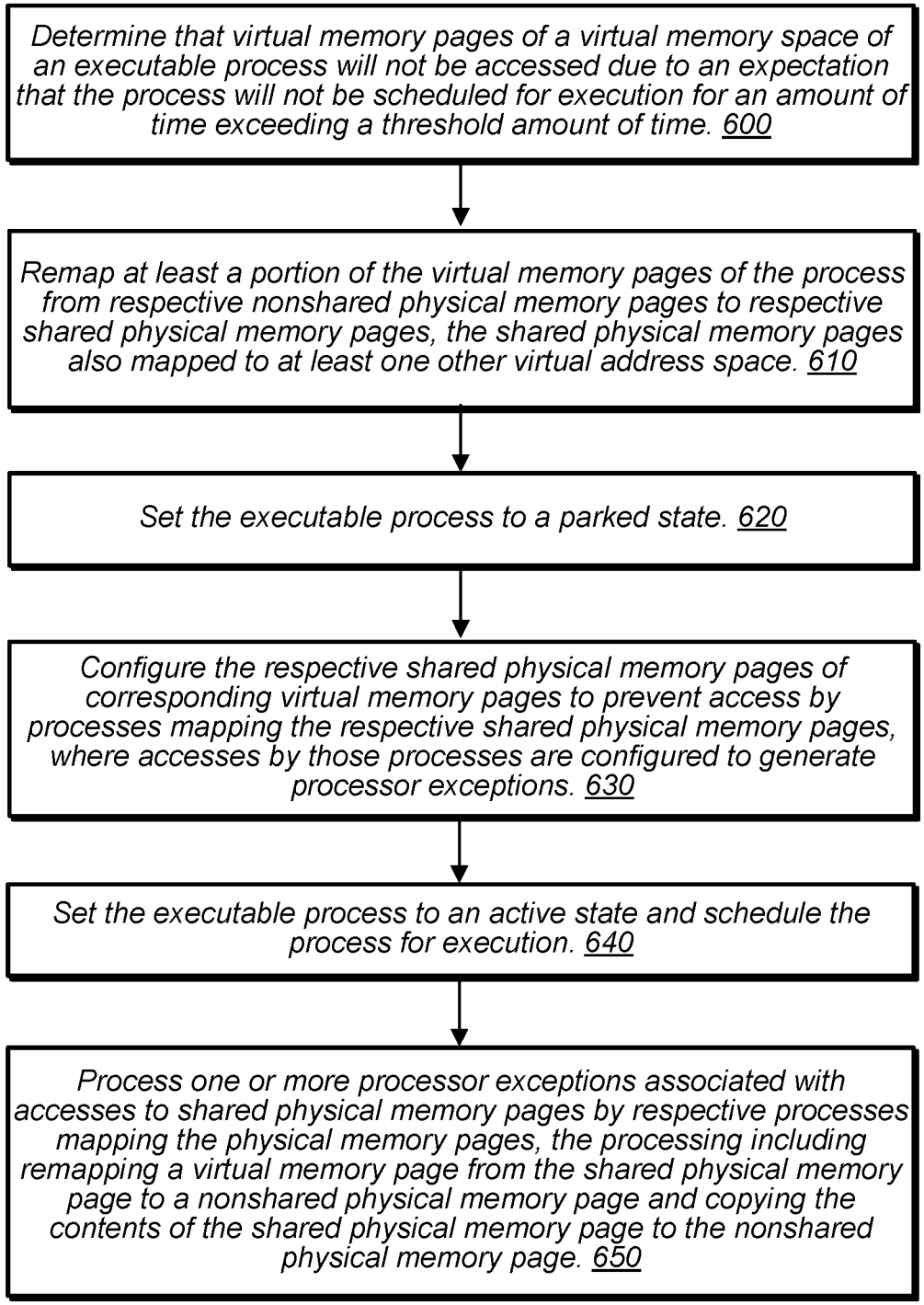
FIG. 6 is a flow diagram illustrating safe sharing of memory pages including copying of shared pages on demand, according to some embodiments.

FIG. 6 is a flow diagram illustrating safe sharing of memory pages including copying of shared pages on demand, according to some embodiments. The method begins at step 600 where it may be determined, by a shared memory manager such as the virtual memory manager 152 or scheduler 154 as shown in FIG. 1, that virtual memory pages of a virtual memory space of an executable process, such as the active application 166 as shown in FIG. 1, will not be accessed due to an expectation that the process will not be scheduled for execution for an amount of time exceeding a threshold amount of time, in some embodiments. The threshold amount of time may be, in various embodiments, selected in a number of ways. For example, in one embodiment it may set to a constant value greater than zero while in other embodiments it could be determined, for example, by a total number of processes, total amount of allocated or total memory, total number of active or parked processes, and so on. Other means of determining a threshold amount of time may be imagined and the examples are not intended to be limiting. In some embodiments, In addition, in some embodiments the determination to set the process to a parked state may be responsive to determining that a utilization of pages of physical memory exceeds a threshold memory utilization, in addition to or instead of the expectation that the process will not be scheduled for execution for an amount of time. In these embodiments, the utilization of pages of physical memory and the threshold memory utilization may be expressed as a percentage of total physical memory.

Responsive to determining to set a process to a parked state, the method may proceed to step 610 where the memory manager may remap at least a portion of the virtual memory pages, such as virtual memory pages 205 as shown in FIG. 2, of the virtual memory space of the process from respective nonshared physical memory pages, such as the physical memory pages 215*a* and 215*b* of nonshared pages 144 as shown in FIG. 2, to respective shared physical memory pages, such as the physical memory pages 215*c* and 215*d* of shared pages 142 as shown in FIG. 2, in some embodiments. These shared physical memory pages may also be mapped to at least one other virtual address space of another process, in some embodiments. The memory manager may then set the executable process to a parked state, as shown in 620, in some embodiments.

As shown in 630, the memory manager may then configure the remapped virtual memory pages, prior to transitioning the executable process from the parked state to an active state, to prevent access by the executable process to the respective shared physical memory pages, in some embodiments. This configuring may be perform prior to, subsequent to or at the same time as setting the process to a parked state, as shown in 620, in various embodiments. This configuring, however, may occur prior transitioning the executable process from the parked state to an active state.

To perform this configuring, the memory manager may configure the system such that accesses by the executable process to the respective shared physical memory pages generate respective processor interrupts or processor exceptions and may further configure the memory manager to receive and process these respective processor interrupts or processor exceptions, in some embodiments.

The memory manager may then determine that the executable process is to be scheduled for execution, and responsive to the determination set the executable process to an active state and schedule the process for execution, as shown in 640, in some embodiments.

The memory manager may then, as shown in 650, process one or more processor interrupts or processor exceptions responsive to accesses the shared memory pages by the executable process, in some embodiments. This processing may include remapping a virtual memory page from the shared physical memory page to a nonshared physical memory page, such as nonshared memory pages 215 of nonshared pages 144 as shown in FIG. 2, and copying the contents of the shared physical memory page to the nonshared physical memory page, in some embodiments.

Figure 7:
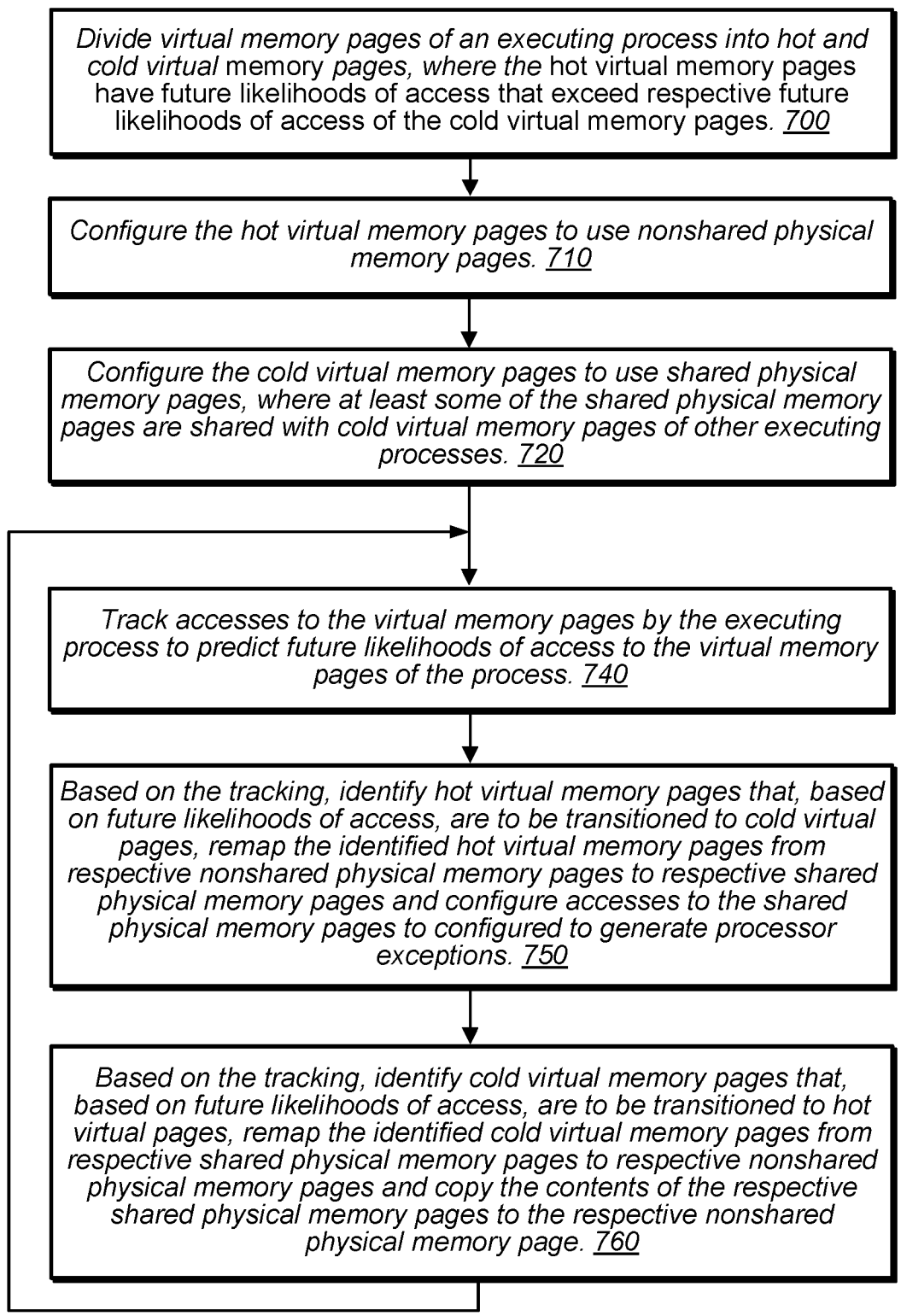
FIG. 7 is a flow diagram illustrating safe sharing of memory pages including tracking of hot and cold virtual memory pages, according to some embodiments.

FIG. 7 is a flow diagram illustrating safe sharing of memory pages tracking of hot and cold virtual memory pages, according to some embodiments. The method begins at step 700 where a shared memory manager such as the virtual memory manager 152 or scheduler 154 as shown in FIG. 1, may divide virtual memory pages of an executing process, such as the active application 166 as shown in FIG. 1, into hot and cold virtual memory pages based on future likelihoods of access to the virtual memory pages, such as virtual memory pages 205 as shown in FIG. 2, of the process, in some embodiments. The hot virtual memory pages may have future likelihoods of access that exceed respective future likelihoods of access of the cold virtual memory pages, in some embodiments. In some embodiments, this dividing may be based on a history of past memory accesses including memory access frequencies. In the event that no such access history is available, for example if the process has not previously executed, the shared memory manager may employ other means of dividing the pages, for example, all pages may initially be identified as hot pages or cold pages in some embodiments. In other embodiments, the shared memory manager may divide memory pages according to information contained in metadata of the process, such as when particular pages store shared code or other shared or non-shared data. These examples of dividing the memory pages are not intended to be limiting and a variety of schemes for dividing the memory pages may be employed, in various embodiments.

The method may then proceed to step 710 where the determined hot virtual memory pages may be configured to use non-shared physical pages, such as the nonshared pages 144 as shown in FIG. 1, in some embodiments. In addition, as shown in 720, the determined cold virtual memory pages may be configured to use shared physical memory pages, where at least some of the shared physical memory pages are also configured to be used by cold virtual memory pages of other executing processes, in some embodiments.

As shown in 740, the shared memory manager may then track accesses to virtual memory pages by the executing process, such as the active application 166 as shown in FIG. 1, to predict future likelihoods of access to the virtual memory pages, such as virtual memory pages 205 as shown in FIG. 2, of the process, in some embodiments. Based on this tracking, the shared memory manager may identify hot virtual memory pages that, based on future likelihoods of access, may be transformed into cold virtual memory pages, as shown in 750. To transform these hot virtual memory pages into cold memory pages, the shared memory manager may remove respective mappings to non-shared physical memory pages and release the non-shared physical memory pages for use, and then map shared physical memory pages containing matching data to the virtual memory pages, in some embodiments. In addition, the shared memory manager may configure accesses to the shared memory pages to generate processor exceptions, in some embodiments.

In addition, based on this tracking, the shared memory manager may identify cold virtual memory pages that, based on future likelihoods of access, may be transformed into hot virtual memory pages, as shown in 760. To transform these cold virtual memory pages into hot memory pages, the shared memory manager may remove respective mappings to shared physical memory pages, map respective nonshared physical memory pages to the virtual memory pages and copy the contents of the respective unmapped shared memory pages to the newly mapped non-shared memory pages, in some embodiments. The process may then return to step 740.

Figure 8:
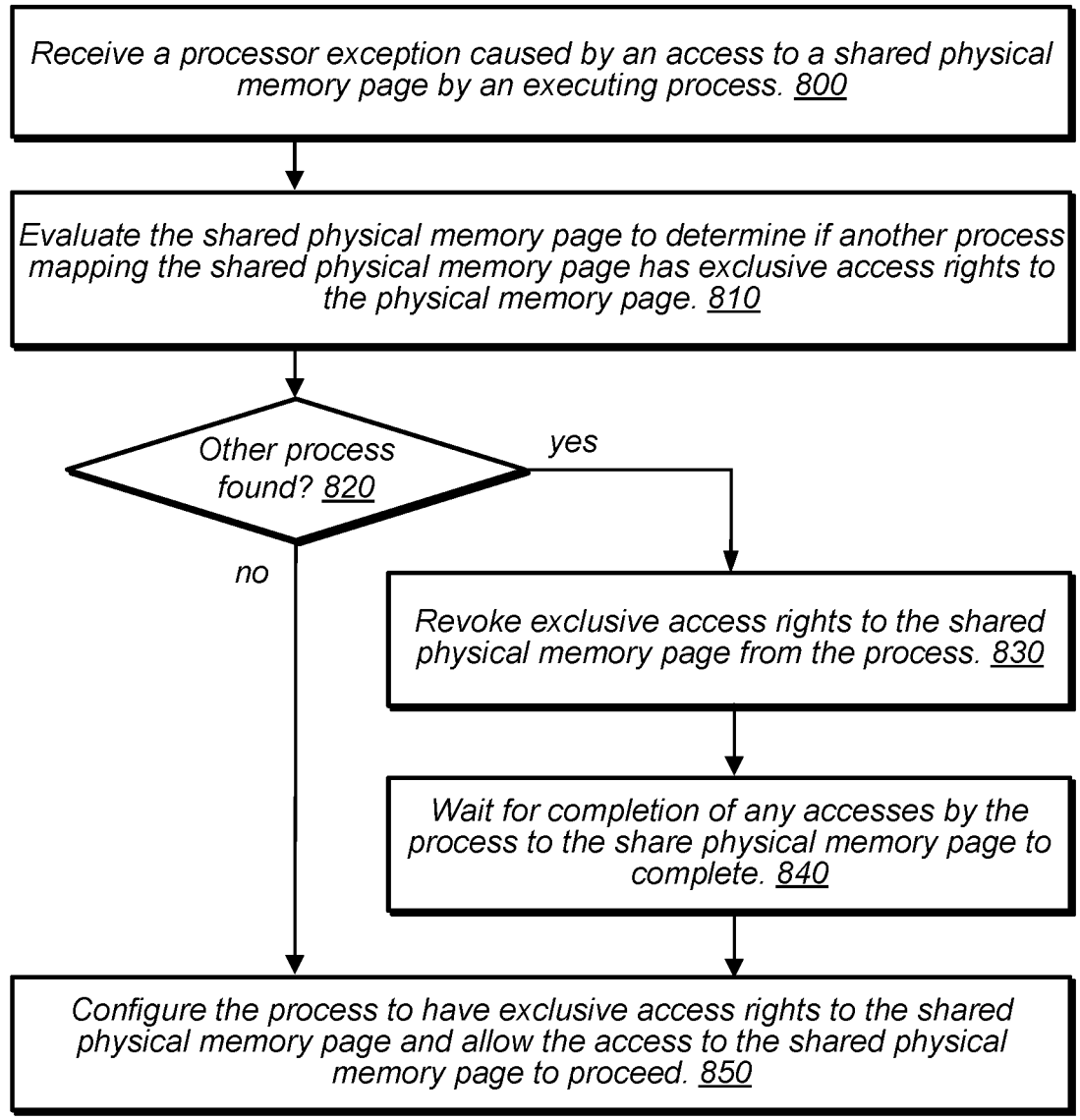
FIG. 8 is a flow diagram illustrating coordinating access to shared physical memory pages, according to some embodiments.

FIG. 8 is a flow diagram illustrating coordinating access to shared physical memory pages, according to some embodiments. The method begins at step 800 where a processor exception may be received by a shared memory manager such as the virtual memory manager 152 as shown in FIG. 1, generated by an access to shared physical memory by an executing process, such as the active application 166 as shown in FIG. 1, in some embodiments.

The method may proceed to step 810 where the shared physical memory page may be evaluated to determine if a process mapping the shared physical memory page currently has exclusive access rights to the physical memory page, in some embodiments. This exclusive access right may allow a process to access the shared physical memory page without any concurrent accesses to the memory page occurring from other processes also sharing the physical memory page, in some embodiments.

If no process currently holds exclusive access rights to the physical memory page, as shown in a negative exit from step 820, the method may proceed to step 850 where the process may be granted exclusive access rights to the shared physical memory page and the access causing the processor exception allowed to proceed, in some embodiments. The method is then complete.

If, however, a process is found that currently holds exclusive access rights to the physical memory page, as shown in a positive exit from step 820, the method may proceed to step 350 where the exclusive access rights to the shared physical memory page for the found process may be revoked, in some embodiments. The method may then proceed to step 840 where any accesses to the shared physical memory page by the found process that are currently in process may be allowed to complete. Once all currently executing accesses to the shared physical memory page have completed, the method may proceed to step 850 where the process may be granted exclusive access rights to the shared physical memory page and the access causing the processor exception allowed to proceed, in some embodiments. The method is then complete.

Figure 9:
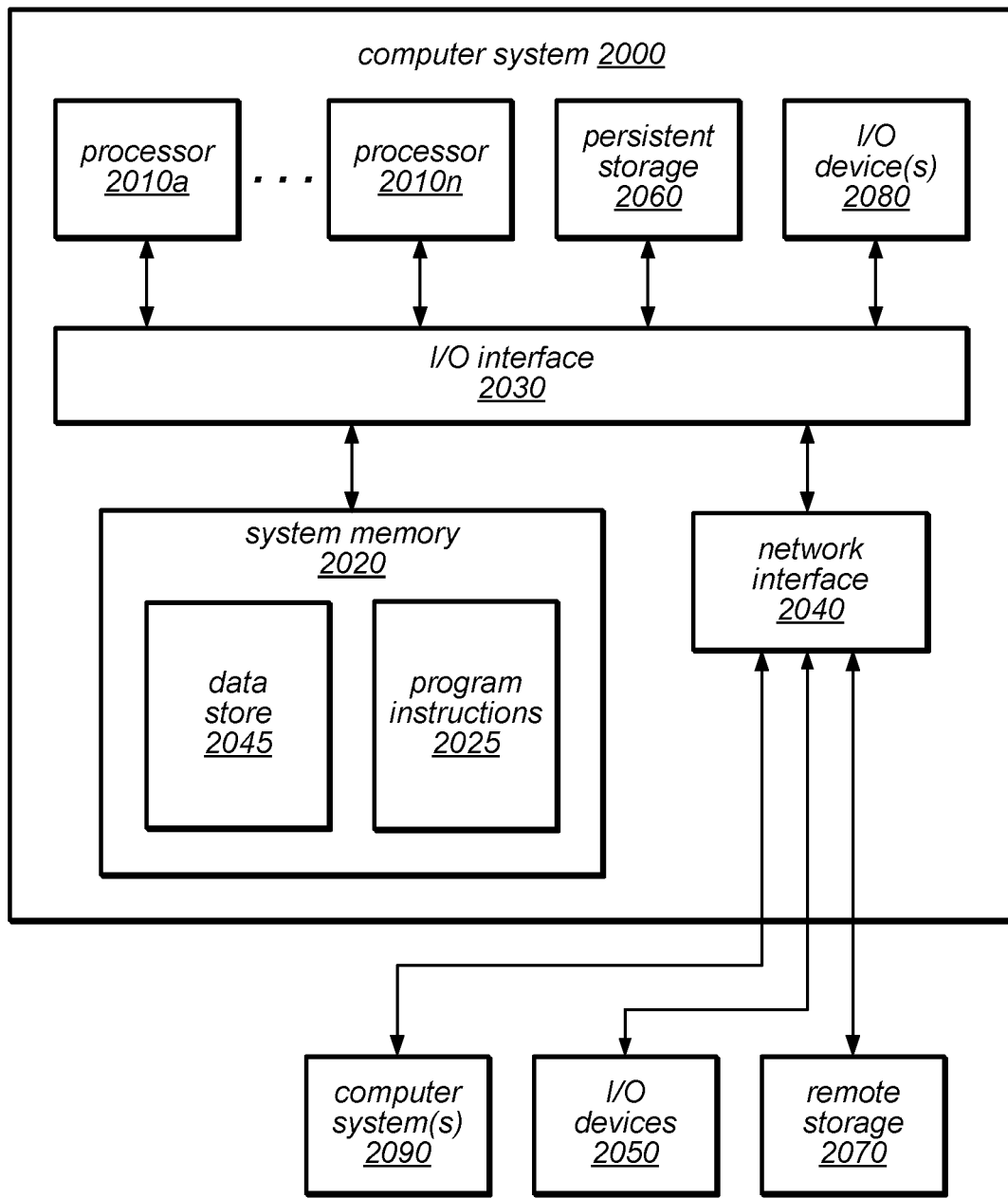
FIG. 9 is a block diagram illustrating an example computer system, according to various embodiments.

Any of various computer systems may be configured to implement processes associated with a technique for multi-region, multi-primary data store replication as discussed with regard to the various figures above. FIG. 9 is a block diagram illustrating one embodiment of a computer system suitable for implementing some or all of the techniques and systems described herein. In some cases, a host computer system may host multiple virtual instances that implement the servers, request routers, storage services, control systems or client(s). However, the techniques described herein may be executed in any suitable computer environment (e.g., a cloud computing environment, as a network-based service, in an enterprise environment, etc.).

Various ones of the illustrated embodiments may include one or more computer systems 2000 such as that illustrated in FIG. 9 or one or more components of the computer system 2000 that function in a same or similar way as described for the computer system 2000.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030. In some embodiments, computer system 2000 may be illustrative of servers implementing enterprise logic or downloadable applications, while in other embodiments servers may include more, fewer, or different elements than computer system 2000.

Computer system 2000 includes one or more processors 2010 (any of which may include multiple cores, which may be single or multi-threaded) coupled to a system memory 2020 via an input/output (I/O) interface 2030. Computer system 2000 further includes a network interface 2040 coupled to I/O interface 2030. In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA. The computer system 2000 also includes one or more network communication devices (e.g., network interface 2040) for communicating with other systems and/or components over a communications network (e.g. Internet, LAN, etc.). For example, a client application executing on system 2000 may use network interface 2040 to communicate with a server application executing on a single server or on a cluster of servers that implement one or more of the components of the embodiments described herein. In another example, an instance of a server application executing on computer system 2000 may use network interface 2040 to communicate with other instances of the server application (or another server application) that may be implemented on other computer systems (e.g., computer systems 2090).

System memory 2020 may store instructions and data accessible by processor 2010. In various embodiments, system memory 2020 may be implemented using any suitable memory technology, such as static random-access memory (SRAM), synchronous dynamic RAM (SDRAM), non-volatile/Flash-type memory, or any other type of memory. In the illustrated embodiment, program instructions and data implementing desired functions, such as those methods and techniques described above for the downloadable software or provider network are shown stored within system memory 2020 as program instructions 2025. In some embodiments, system memory 2020 may include data store 2045 which may be configured as described herein.

In some embodiments, system memory 2020 may be one embodiment of a computer-accessible medium that stores program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 2000 via I/O interface 2030. A computer-readable storage medium may also include any volatile or non-volatile media such as RAM (e.g. SDRAM, DDR SDRAM, RDRAM, SRAM, etc.), ROM, etc., that may be included in some embodiments of computer system 2000 as system memory 2020 or another type of memory. Further, a computer-accessible medium may include transmission media or signals such as electrical, electromagnetic, or digital signals, conveyed via a communication medium such as a network and/or a wireless link, such as may be implemented via network interface 2040.

In one embodiment, I/O interface 2030 may coordinate I/O traffic between processor 2010, system memory 2020 and any peripheral devices in the system, including through network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments, some or all of the functionality of I/O interface 2030, such as an interface to system memory 2020, may be incorporated directly into processor 2010.

Network interface 2040 may allow data to be exchanged between computer system 2000 and other devices attached to a network, such as between a client device and other computer systems, or among hosts, for example. In particular, network interface 2040 may allow communication between computer system 800 and/or various other device 2060 (e.g., I/O devices). Other devices 2060 may include scanning devices, display devices, input devices and/or other communication devices, as described herein.

Network interface 2040 may commonly support one or more wireless networking protocols (e.g., Wi-Fi/IEEE 802.7, or another wireless networking standard). However, in various embodiments, network interface 2040 may support communication via any suitable wired or wireless general data networks, such as other types of Ethernet networks, for example. Additionally, network interface 2040 may support communication via telecommunications/telephony networks such as analog voice networks or digital fiber communications networks, via storage area networks such as Fibre Channel SANs, or via any other suitable type of network and/or protocol.

In some embodiments, I/O devices may be relatively simple or "thin" client devices. For example, I/O devices may be implemented as dumb terminals with display, data entry and communications capabilities, but otherwise little computational functionality. However, in some embodiments, I/O devices may be computer systems implemented similarly to computer system 2000, including one or more processors 2010 and various other devices (though in some embodiments, a computer system 2000 implementing an I/O device 2050 may have somewhat different devices, or different classes of devices).

In various embodiments, I/O devices (e.g., scanners or display devices and other communication devices) may include, but are not limited to, one or more of: handheld devices, devices worn by or attached to a person, and devices integrated into or mounted on any mobile or fixed equipment, according to various embodiments. I/O devices may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with the computer system 2000. In general, an I/O device (e.g., cursor control device, keyboard, or display(s) may be any device that can communicate with elements of computing system 2000.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein.

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

Embodiments of decentralized application development and deployment as described herein may be executed on one or more computer systems, which may interact with various other devices. FIG. 9 is a block diagram illustrating an example computer system, according to various embodiments. For example, computer system 2000 may be configured to implement nodes of a compute cluster, a distributed key value data store, and/or a client, in different embodiments. Computer system 2000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of compute node, computing node, or computing device.

In the illustrated embodiment, computer system 2000 also includes one or more persistent storage devices 2060 and/or one or more I/O devices 2080. In various embodiments, persistent storage devices 2060 may correspond to disk drives, tape drives, solid state memory, other mass storage devices, or any other persistent storage device. Computer system 2000 (or a distributed application or operating system operating thereon) may store instructions and/or data in persistent storage devices 2060, as desired, and may retrieve the stored instruction and/or data as needed. For example, in some embodiments, computer system 2000 may be a storage host, and persistent storage 2060 may include the SSDs attached to that server node.

In some embodiments, program instructions 2025 may include instructions executable to implement an operating system (not shown), which may be any of various operating systems, such as UNIX, LINUX, Solaris™, MacOS™, Windows™, etc. Any or all of program instructions 2025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 2000 via I/O interface 2030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 2000 as system memory 2020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 2040.

It is noted that any of the distributed system embodiments described herein, or any of their components, may be implemented as one or more network-based services. For example, a compute cluster within a computing service may present computing services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
one or more processors; and
a memory storing program instructions that, when executed on the one or more processors, implement a memory manager configured to:
determine that a future likelihood of access for a virtual memory page of a virtual memory space of an executable process is below a threshold likelihood of access, wherein the determining is based at least in part on an execution status of the executable process or a tracking of memory accesses to the virtual memory page of the executable process to predict respective future likelihoods of access; and
responsive to the determining:
remap the virtual memory page from a non-shared physical memory page of a computing device to a shared physical memory page mapped to another executable process that comprises another virtual memory space different from the virtual memory space of the executable process, wherein data of the shared physical memory page, which is mapped to the virtual memory page as a result of the remapping matches data of the non-shared physical memory page; and
configure the executable process to generate a processor exception on an access to the virtual memory page.

2. The system of claim 1, wherein determining that the future likelihood of access for the virtual memory page of the executable process is below a threshold likelihood of access is based on determining that the executable process will not be scheduled for execution for an amount of time exceeding a threshold amount of and wherein the remapping of the virtual memory page and the configuring of the executable process are performed as part of setting the executable process to a parked state.

3. The system of claim 1: wherein the virtual memory page is one of a plurality of virtual memory pages of an executable process including hot and cold virtual memory pages; wherein the memory manager is further configured to track memory accesses of the executable process to predict respective future likelihoods of access to respective ones of the plurality of virtual memory pages, the respective ones of the hot virtual memory pages having future likelihoods of access that exceed respective future likelihoods of access of respective ones of the cold virtual memory pages; and wherein the determining that the future likelihood of access for the virtual memory page of an executable process is below the threshold likelihood of access is based at least in part on the tracking.

4. The system of claim 1, wherein the memory manager is further configured to:
determine that a future likelihood of access for another virtual memory page of the executable process is equal to or above the threshold likelihood of access, and responsive to the determining: copy another shared physical memory page mapped to the other virtual memory page to another non-shared physical memory page; and remap the other virtual memory page from the other shared physical memory page to the other non-shared physical memory page.

5. A method, comprising:
determining that a future likelihood of access for a virtual memory page of an executable process is below a threshold likelihood of access, and responsive to the determining:
remapping the virtual memory page from a non-shared physical memory page of a computing device to a shared physical memory page mapped to another executable process that comprises another virtual memory space different from the virtual memory space of the executable process, wherein data of the shared physical memory page, which is mapped to the virtual memory page as a result of the remapping matches data of the non-shared physical virtual memory page.

6. The method of claim 5: wherein determining that the future likelihood of access for the virtual memory page of the executable process is below a threshold likelihood of access is based on determining that the executable process will not be scheduled for execution for an amount of time exceeding a threshold amount of time; and wherein the remapping is performed as part of setting the executable process to a parked state.

7. The method of claim 6, further comprising: performing, responsive to a request to schedule the process for execution: remapping the virtual memory page from the shared physical memory page to another non-shared physical memory page; and copying the shared physical memory page to the other non-shared physical memory page.

8. The method of claim 5, further comprising configuring the executable process to generate a processor exception on an access to the virtual memory page.

9. The method of claim 5: wherein the virtual memory page is one of a plurality of virtual memory pages of an executable process including hot and cold virtual memory pages; wherein the method further comprises tracking memory accesses of the executable process to predict respective future likelihoods of access to respective ones of the plurality of virtual memory pages, the respective ones of the hot virtual memory pages having future likelihoods of access that exceed respective future likelihoods of access of respective ones of the cold virtual memory pages; and wherein determining that the future likelihood of access for the virtual memory page of an executable process is below the threshold likelihood of access is based at least in part on the tracking.

10. The method of claim 9, further comprising: configuring the executable process to generate a processor exception on an access to the virtual memory page; and processing the processor exception responsive to the access to the remapped virtual page, comprising: determining that the other executable process holds exclusive access to the physical memory page shared with the executable process, and responsive to the determining: revoking the exclusive access to the physical memory page of the other executable process; and waiting for accesses by the other executable process to the physical memory page to complete; and granting exclusive access to the physical memory page shared with the other executable process to the executable process.

11. The method of claim 5, further comprising: determining that a future likelihood of access for another virtual memory page of the executable process is equal to or above the threshold likelihood of access, and responsive to the determining: copying another shared physical memory page mapped to the other virtual memory page to another non-shared physical memory page; and remapping the other virtual memory page from the other shared physical memory page to the other non-shared physical memory page.

12. The method of claim 5, wherein the executable process and the other executable process implement respective virtual machines maintained in an executable state as part of a computing service of a provider network, wherein the remapping is performed responsive to determining that the virtual machine implemented by the executable process is to be set to a parked state.

13. One or more non-transitory computer-accessible storage media storing program instructions that when executed on or across one or more computing devices cause the one or more computing devices to perform:
   determining that a future likelihood of access for a virtual memory page of an executable process is below a threshold likelihood of access, and responsive to the determining:
   remapping the virtual memory page from a non-shared physical memory page of a computing device to a shared physical memory page mapped to another executable process that comprises another virtual memory space different from the virtual memory space of the executable process, wherein data of the shared physical memory page, which is mapped to the virtual memory page as a result of the remapping matches data of the non-shared physical memory page.

14. The one or more non-transitory computer-accessible storage media of claim 13: wherein determining that the future likelihood of access for the virtual memory page of the executable process is below a threshold likelihood of access is based on determining that the executable process will not be scheduled for execution for an amount of time exceeding a threshold amount of time; and wherein the remapping is performed as part of setting the executable process to a parked state.

15. The one or more non-transitory computer-accessible storage media of claim 14, wherein the program instructions, when executed on or across one or more computing devices, cause the one or more computing devices to further perform, responsive to a request to schedule the process for execution, remapping the virtual memory page from the shared physical memory page to another non-shared physical memory page; and copying the shared physical memory page to the other non-shared physical memory page.

16. The one or more non-transitory computer-accessible storage media of claim 13, wherein the remapping is performed responsive to determining that a utilization of physical memory pages of the computing device exceeds a threshold memory utilization.

17. The one or more non-transitory computer-accessible storage media of claim 13: wherein the virtual memory page is one of a plurality of virtual memory pages of an executable process including hot and cold virtual memory pages, wherein the program instructions, when executed on or across one or more computing devices, cause the one or more computing devices to further perform tracking memory accesses of the executable process to predict respective future likelihoods of access to respective ones of the plurality of virtual memory pages, the respective ones of the hot virtual memory pages having future likelihoods of access that exceed respective future likelihoods of access of respective ones of the cold virtual memory pages; and wherein determining that the future likelihood of access for the virtual memory page of an executable process is below the threshold likelihood of access is based at least in part on the tracking.

18. The one or more non-transitory computer-accessible storage media of claim 13, wherein the program instructions, when executed on or across one or more computing devices, cause the one or more computing devices to further perform: processing the processor exception responsive to the access to the remapped virtual page, comprising: determining that the other executable process holds exclusive access to the physical memory page shared with the executable process, and responsive to the determining: revoking the exclusive access to the physical memory page of the other executable process; and waiting for accesses by the other executable process to the physical memory page to complete; and granting exclusive access to the physical memory page shared with the other executable process to the executable process.

19. The one or more non-transitory computer-accessible storage media of claim 13, wherein the program instructions, when executed on or across one or more computing devices, cause the one or more computing devices to further perform: determining that a future likelihood of access for another virtual memory page of the executable process is equal to or above the threshold likelihood of access, and responsive to the determining: copying another shared physical memory page mapped to the other virtual memory page to another non-shared physical memory page; and remapping the other virtual memory page from the other shared physical memory page to the other non-shared physical memory page.

20. The one or more non-transitory computer-accessible storage media of claim 13, wherein the executable process and the other executable process implement respective virtual machines maintained in an executable state as part of a computing service of a provider network, wherein the remapping is performed responsive to determining that the virtual machine implemented by the executable process is to be set to a parked state.

* * * * *